US009791953B2

(12) United States Patent
Wang et al.

(10) Patent No.: US 9,791,953 B2
(45) Date of Patent: Oct. 17, 2017

(54) TOUCH DISPLAY DEVICE AND METHOD FOR DRIVING THE TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Lihua Wang, Shanghai (CN); Xingyao Zhou, Shanghai (CN); Xianxiang Zhang, Shanghai (CN); Yingying Xu, Shanghai (CN); Xiaoye Li, Shanghai (CN); Gang Liu, Shanghai (CN)

(73) Assignees: SHANGHAI TIANMA MICRO-ELECTRONICS CO., LTD., Shanghai (CN); TIANMA MICRO-ELECTRONICS., LTD., Shenzhen (CN)

( * ) Notice: Subject to any disclaimer, the term of this patent is extended or adjusted under 35 U.S.C. 154(b) by 22 days.

(21) Appl. No.: 14/706,452

(22) Filed: May 7, 2015

(65) Prior Publication Data
US 2016/0170538 A1    Jun. 16, 2016

(30) Foreign Application Priority Data
Dec. 11, 2014 (CN) .......................... 2014 1 0765816

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01); *G06F 2203/04103* (2013.01)

(58) Field of Classification Search
CPC .... G06F 3/04865; G06F 3/0487; G06F 3/044; G06F 3/04875;
(Continued)

(56) References Cited

U.S. PATENT DOCUMENTS 8,823,671 B2 * 9/2014 Nishimura ............ G06F 3/0416
178/18.01
9,075,260 B2 * 7/2015 Liu ...................... G02F 1/13338
(Continued)

FOREIGN PATENT DOCUMENTS

| CN | 103076935 A | 5/2013 |
| CN | 203070263 U | 7/2013 |
| CN | 104020904 A | 9/2014 |

*Primary Examiner* — Stephen Sherman
(74) *Attorney, Agent, or Firm* — Faegre Baker Daniels LLP

(57) ABSTRACT

A touch display device and a method for driving a touch display device. The touch display device includes a touch unit and a display unit; the touch unit includes a first touch electrode layer having a plurality of first touch electrodes, each of which includes a plurality of touch sub-electrodes; the display unit includes an array substrate, a color filter substrate disposed opposite to the array substrate, a display function layer disposed between the array substrate and the color filter substrate, and a plurality of gate electrodes disposed on the array substrate; where, a projection of each of the touch sub-electrodes in a direction perpendicular to the array substrate is located between two adjacent ones of the plurality of gate electrodes.

15 Claims, 11 Drawing Sheets

(58) Field of Classification Search
CPC ............ G06F 2203/04101–2203/04113; G06F 3/041–3/047
USPC ..................... 345/173–179; 178/18.01–18.04
See application file for complete search history.

(56) References Cited

U.S. PATENT DOCUMENTS

| | | | |
|---|---|---|---|
| 2007/0132737 A1* | 6/2007 | Mulligan | G06F 3/0418 345/173 |
| 2009/0002338 A1* | 1/2009 | Kinoshita | G06F 3/045 345/174 |
| 2011/0102359 A1* | 5/2011 | Chiba | G02F 1/13338 345/173 |
| 2014/0002757 A1 | 1/2014 | Nagami | |

* cited by examiner

TOUCH DISPLAY DEVICE AND METHOD FOR DRIVING THE TOUCH DISPLAY DEVICE

CROSS-REFERENCE TO RELATED APPLICATION

This application claims priority to Chinese Application No. 201410765816.3, filed Dec. 11, 2014, which is herein incorporated by reference in its entirety.

TECHNICAL FIELD

The present application relates to a display device, in particular to a touch display device and a method for driving the touch display device.

BACKGROUND

In recent years, with the development of smartphones and tablet computers, capacitive touch screens have been rapidly developed in markets. When a finger or other object touches the screen, a coupling capacitance is formed between the finger and an electrode of the touch screen, and the position of the touch point can be obtained by detecting a change in capacitance at the electrode.

FIG. 1A is a cross-sectional diagram showing a display device provided in a related art (Chinese Patent application No. CN200910132037.9). The display device includes at least an array substrate, an opposite substrate disposed opposite to the array substrate, and a liquid crystal layer 30 between the array substrate and the opposite substrate, where, the array substrate is formed of a Thin Film Transistor (TFT) substrate 11, a gate electrode layer 12 and a common electrode layer 13 both on the TFT substrate 11, the opposite substrate is formed of a protective layer 21, a sensing electrode 22, a glass substrate 23 and a color filter 24, and a capacitance C1 is formed between the sensing electrode 22 and the common electrode layer 13, where, the common electrode layer 13 can be directly disposed on the TFT 11 as shown in FIG. 1A, or disposed at a side of the opposite substrate facing to the array substrate (not shown) and it can also be disposed at a side of the opposite substrate that is away from the array substrate (not shown). FIG. 1B is a top view showing the common electrode layer 13 of the display device provided in the related art. The common electrode layer 13 functions as a driving electrode in the display device and is divided equally into a number of rows according to the number of channels of drive signals. As shown in FIG. 1B, the common electrode layer 13 is divided into n driving electrodes, and labeled with 13-1, 13-2, 13-3, ..., 13-n. These rows are scanned in a line-by-line scanning manner or in a lines-by-lines scanning manner to sequentially scan the driving electrodes 13-1, 13-2, 13-3, and so on. FIG. 1C is a schematic diagram of driving the common electrode layer 13 in the related art, where the FIG. 1C shows the sensing electrode 22 perpendicular to the driving electrodes. When the electrodes in the common electrode layer 13 are scanned, the capacitance between the sensing electrode 22 and the scanned electrodes are changed. As shown, the electrodes are represented by 13-1, 13-2, 13-3, 13-4, and 13-5, respectively, and the capacitances between the sensing electrode 22 and the scanned electrodes are represented by C1-1, C1-2, C1-3, C1-4 and C1-5, respectively.

In the related art, the common electrode layer is divided into a number of rows according to the number of channels of drive signals to be multiplexed as driving electrodes. When the size of the panel is larger, a load of the drive signal becomes larger, so that the charging time required for the common electrode layer will become longer accordingly. For an In-cell touch screen with a time-sharing operation, a competitive relation exists between the touch electrode operating time and the driving electrode operating time, so that when the load of the driving electrode is larger, the required charging time is longer accordingly, thereby affecting the drive capability of the display device.

SUMMARY

In order to solve the problem in the related art, the present disclosure provides a touch display device, including:
a touch unit and a display unit; the touch unit includes a first touch electrode layer having a plurality of first touch electrodes, each of which includes a plurality of touch sub-electrodes; the display unit includes an array substrate, a color filter substrate disposed opposite to the array substrate, a display function layer disposed between the array substrate and the color filter substrate, and a plurality of gate electrodes disposed on the array substrate;
where, a projection of each of the touch sub-electrodes in a direction perpendicular to the array substrate is located between two adjacent ones of the plurality of gate electrodes.

The present disclosure further provides a touch display apparatus, including the touch display device.

The present disclosure further provides a method for driving the touch display device, the method includes:
applying a touch driving signal to a plurality of first touch electrodes; detecting the signal of the plurality of first touch electrodes; and determining a position of a touch point according to a change of the touch sensing signal of the plurality of first touch electrodes relative to the touch driving signal before and after the touch.

The present disclosure further provides a method for driving the touch display device, the method includes:
applying a touch driving signal to a plurality of driving electrodes; outputting a touch sensing signal by the plurality of touch electrodes; and determining a position of a touch point according to a change of the touch sensing signal before and after the touch; where, if the driving electrodes are first touch electrodes, the sensing electrodes are second touch electrodes or third touch electrodes, or if the driving electrodes are second touch electrodes or third touch electrodes, the sensing electrodes are first touch electrodes.

The present disclosure divides the first touch electrode layer of the touch unit into a plurality of first touch electrodes, each of which of divided into a plurality of touch sub-electrodes according to the arrangement manner of the gate electrodes, a projection of each of the touch sub-electrodes in a direction perpendicular to the array substrate is located between two adjacent ones of the plurality of gate electrodes, thereby reducing the capacitance between the first touch electrode and the gate electrode; additionally, the plurality of touch sub-electrodes divided by the first touch electrode are connected at periphery of the gate electrodes, the first driving circuit transmits a touch signal to odd rows of touch sub-electrodes from the first touch electrode, and the second driving circuit transmits a touch signal to even rows of touch sub-electrodes from the first touch electrode, so that a load of the touch signal in the first touch electrode is reduced, thereby significantly decreasing charging time of the first touch electrode.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the disclosure, and other drawings may also be obtained from the described drawings by those skilled in the art without any creative work.

Figure 1A:
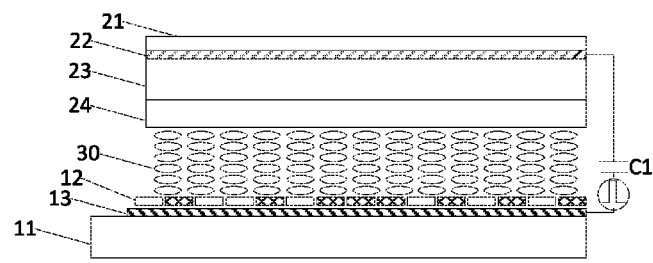
FIG. 1A is a cross-sectional diagram showing a display device provided in a related art.
Figure 1B:
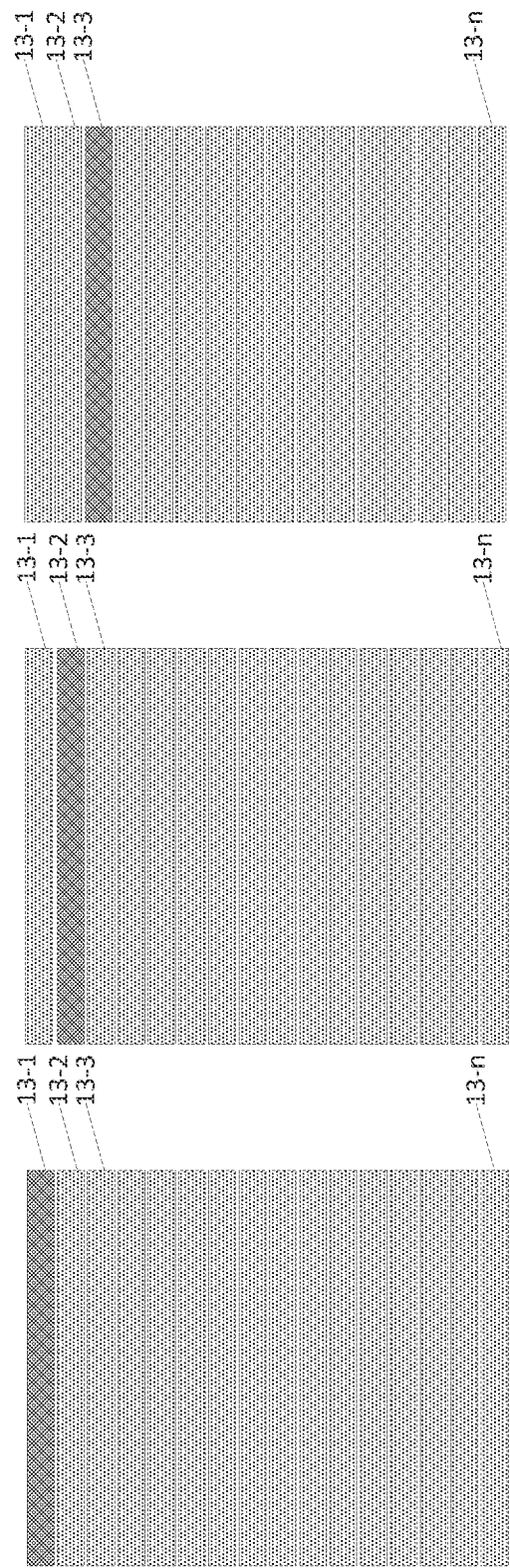
FIG. 1B is a top view showing the common electrode layer of the display device provided in the related art.
Figure 1C:
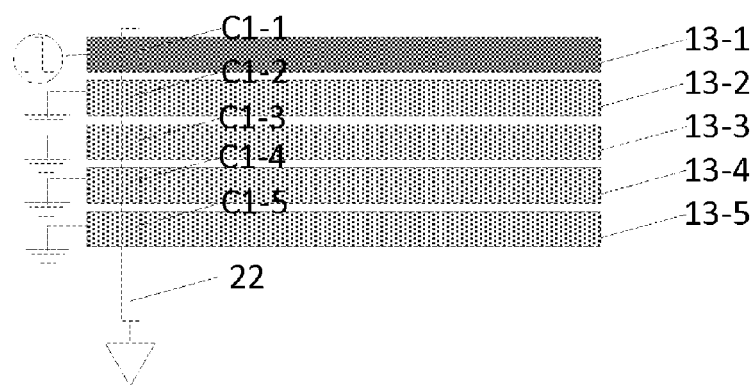
FIG. 1C is a schematic diagram of driving the common electrode layer of the display device in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the present disclosure more clear, the technical solutions in the embodiments of the disclosure are clearly and completely described below in combination with the drawings. Obviously, the described embodiments are some instead of all embodiments of the disclosure. All other embodiments obtained in light of the described embodiments of the disclosure by those skilled in the art without any creative work should fall within the protection scope of the present disclosure.

The technical solutions of the embodiments are suitable for multiplexing a touch electrode layer as a common electrode layer. The touch electrode layer of the touch display device of the embodiments is divided into a plurality of touch sub-electrodes, which are connected with each other in different connection manners to form the touch electrodes.

Figure 2A:
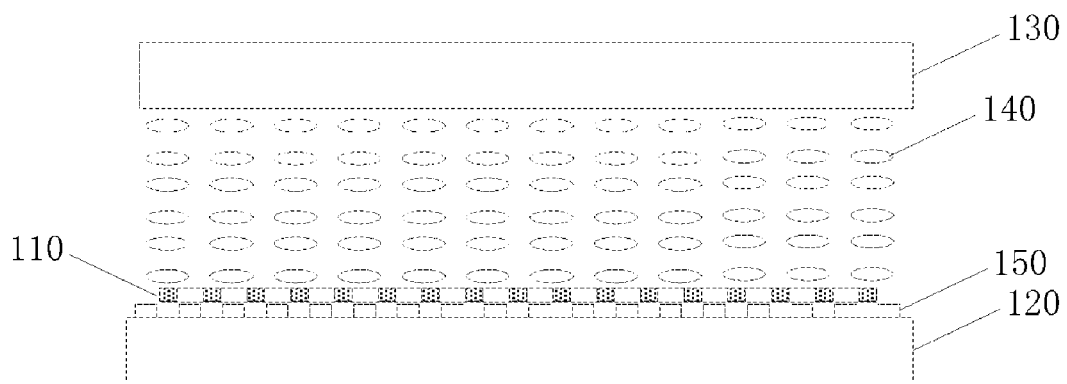
FIG. 2A is a cross-sectional diagram showing a touch display device, according to embodiments of the disclosure.
Figure 2B:
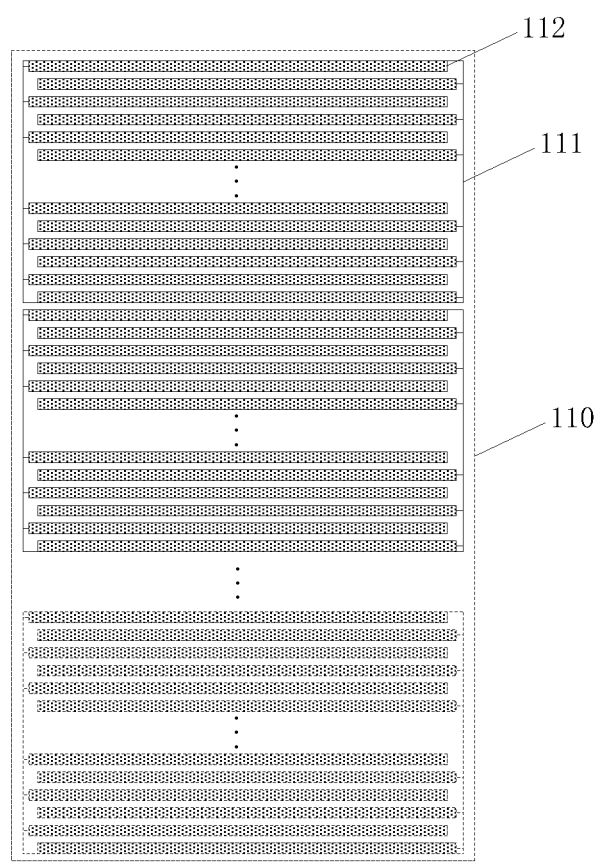
FIG. 2B is a top view of a first touch electrode layer, according to embodiments of the disclosure.

FIG. 2A is a cross-sectional diagram showing a touch display device, according to embodiments of the disclosure. In order to illustrate the structure of the touch display device in detail, FIG. 2A is illustrated in combination with FIG. 2B and FIG. 2C. FIG. 2B is a top view of a first touch electrode layer, according to embodiments of the disclosure and FIG. 2C is a top view of the first touch electrode layer and an array substrate, according to embodiments of the disclosure.

The touch display device provided by the present disclosure includes: a touch unit and a display unit. The touch unit includes a first touch electrode layer 110 of which the structure is shown in FIG. 2B, and the first touch electrode layer 110 has a plurality of first touch electrodes 111, each of which is formed of a plurality of touch sub-electrodes 112. The display unit includes an array substrate 120, a color filter substrate 130 disposed opposite to the array substrate 120, a display function layer 140 disposed between the array substrate 120 and the filer film substrate 130, and a plurality of gate electrodes 150 disposed on the array substrate 120; where, a projection of each of the touch sub-electrodes 112 in a direction perpendicular to the array substrate 120 is located between two adjacent ones of the plurality of gate electrodes 150.

Here, the array substrate 120 may be a substrate formed of an Thin Film Transistor (TFT) array, the display function layer 140 may be a liquid crystal molecule layer, and the first touch electrode layer 110 can be directly disposed on the array substrate 120, as shown in FIG. 2A. Additionally, the first touch electrode layer 110 may be further disposed on a side of the color filter substrate 130 facing to the array substrate 120 (not shown), or disposed on a side of the color filter substrate 130 that is away from the array substrate 120 (not shown), a projection of any of the touch sub-electrodes 112 of the first touch electrode layer 110 in a direction perpendicular to the array substrate 120 is located between two ones of the plurality of gate electrodes 150, and specifically, at least one gate electrode 150 are presented between two adjacent touch sub-electrodes 112.

Figure 2C:
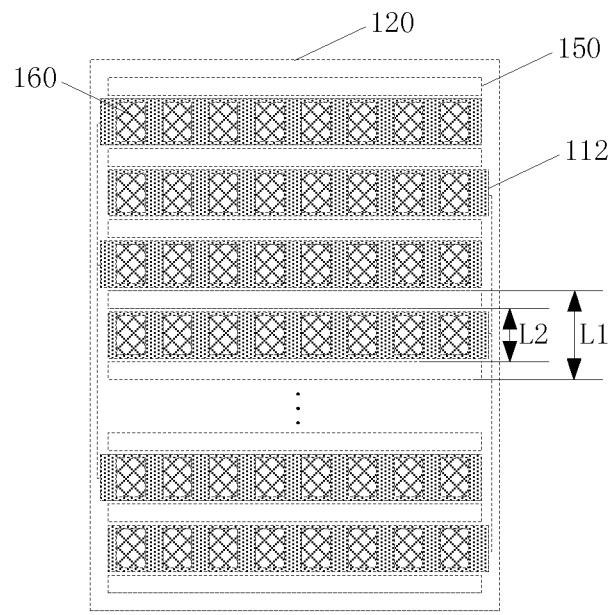
FIG. 2C is a top view of the first touch electrode layer and an array substrate, according to embodiments of the disclosure.

FIG. 2C is a top view showing the first touch electrode layer 110 and the array substrate 120, according to embodiments of the disclosure. The first touch electrode layer 110 is divided into a plurality of first touch electrodes 111 having the same or different widths, each of the first touch electrode 111 is further divided into a plurality of individual touch sub-electrodes 112 according to display spaces, and a projection of any of the divided touch sub-electrodes 112 in a direction perpendicular to the array substrate 120 is located between two adjacent ones of the plurality of gate electrodes 150. Each of the touch sub-electrodes 112 may partly cover the two adjacent gate electrodes 150 corresponding thereto, or alternatively, may uncover the two adjacent gate electrodes 150 corresponding thereto. In other words, in a direction perpendicular to the array substrate 120, the touch sub-electrodes 112 partly or completely avoid the location where the gate electrode 150 is located, thereby reducing parasitic capacitance between the gate electrode 150 and the touch sub-electrode 112. As shown in FIG. 2C, the touch sub-electrode 112 uncovers the two adjacent gate electrodes 150 corresponding thereto.

For any of the touch sub-electrodes 112, compared with the case that the touch sub-electrode 112 completely covers the two adjacent gate electrodes 150 corresponding the touch sub-electrode 112, if the touch sub-electrode 112 partly covers the two adjacent gate electrodes 150 corresponding thereto, the parasitic capacitance between the gate electrodes 150 and the touch sub-electrode 112 can be reduced and a load of the touch signal can be reduced; further, compared with the case that the touch sub-electrode 112 partly covers the two adjacent gate electrodes 150 corresponding thereto, if the touch sub-electrode 112 uncovers the two adjacent gate electrodes 150 corresponding thereto, the gate electrodes 150 and the touch sub-electrode 112 do not overlap with each other in a direction perpendicular to the array substrate 120, so that the coupling capacitance generated between the gate electrodes 150 and the touch sub-electrode 112 is further smaller, and the load of the touch signal is further smaller, so as to reduce charging time of the first touch electrode 111.

As shown in FIG. 2C, since a plurality of gate electrodes 150 are provided on the array substrate 120, distances between two adjacent gate electrodes of the gate electrodes 150 can include an outer width L1 and an inner width L2, where, the outer width L1 refers to a distance between two sides respectively of the two adjacent gate electrodes 150 which are away from each other, and the inner width L2 refers to a distance between two sides respectively of the two adjacent gate electrodes 150 which face to each other. Thereby, if the touch sub-electrode 112 partly covers the two adjacent gate electrodes 150 corresponding thereto, the width of the touch sub-electrode 112 should be smaller than the outer width L1 between the two adjacent gate electrodes 150 corresponding thereto, and larger than the inner width L2 between the two adjacent gate electrodes 150 corresponding thereto; if the touch sub-electrode 112 uncovers the two adjacent gate electrodes 150 corresponding thereto, the width of the touch sub-electrode 112 is smaller than or equal to the inner width L2 between the two adjacent gate electrode 150 corresponding thereto. A plurality of pixels 160 are further provided on the array substrate 120, where, the pixels 160 are arranged in an array form, and a projection of any of the pixels 160 in a direction perpendicular to the array substrate 120 is also located between two adjacent ones of the plurality of gate electrodes 150. Therefore, if the touch sub-electrode 112 uncovers the two adjacent gate electrodes 150 corresponding thereto, the width of the touch sub-electrode 112 is smaller than or equal to the inner width L2 between the two adjacent gate electrodes 150 corresponding thereto. The touch sub-electrode 112 covers the pixel 160 corresponding thereto and the width of the touch sub-electrode 112 is larger than or equal to the width of the pixel 160 corresponding thereto.

Figure 2D:
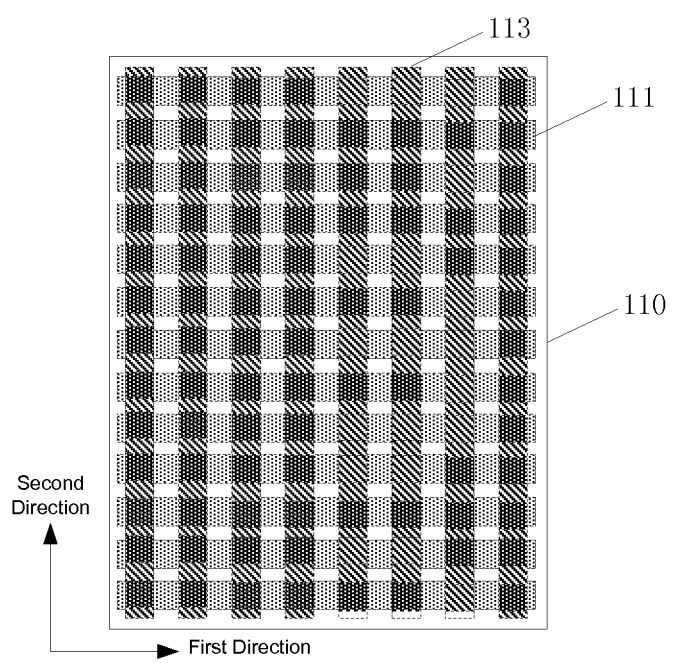
FIG. 2D is a top view showing the touch unit, according to embodiments of the disclosure.

FIG. 2D is a top view showing the touch unit, according to embodiments of the disclosure. As shown in Figures, the touch unit includes a first touch electrode layer 110, and a plurality of touch electrodes 111 of the first touch electrode layer 110 are strip electrodes extending along a first direction and arranged along a second direction, and the second direction is perpendicular to the first direction. Additionally, the first touch electrode layer 110 further includes a plurality of second touch electrodes 113 extending along the second direction and arranged along the first direction, and hence the first touch electrodes 111 are perpendicular to the second touch electrodes 113 to form the touch unit of the touch display device.

Figure 2E:
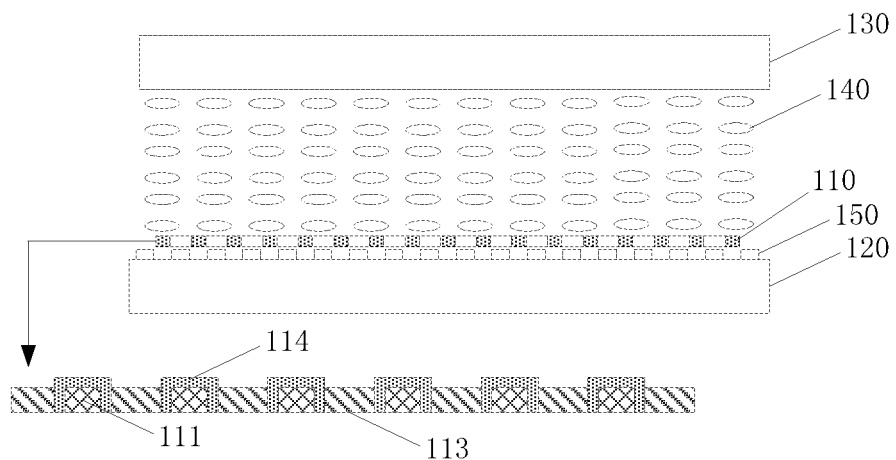
FIG. 2E is a cross-sectional diagram showing the touch unit, according to embodiments of the disclosure.

FIG. 2E is a cross-sectional diagram showing the touch unit, according to embodiments of the disclosure. As can be seen from above, the first touch electrodes 111 can be insulated from the second touch electrodes 113 in the same layer or be insulated overlapped with the second touch electrodes 113, and the first touch electrodes 111 and the second touch electrodes 113 can be disposed on a side of the color filter substrate 130 that is away from the array substrate 120; or, the first touch electrodes 111 can be insulated from the second touch electrodes 113 in the same layer or be insulated overlapped with the second touch electrodes 113, and the first touch electrodes 111 and the second touch electrodes can be disposed between the color filter substrate 130 and the array substrate 120. Specifically, the first touch electrodes 111 and the second touch electrodes 113 may be disposed on a side of the color filter substrate facing to the array substrate 120, or may also be disposed on a side of the array substrate 120 facing to the color filter substrate 130. More specifically, the second touch electrodes 113 and the first touch electrodes 111 in the first touch electrode layer 110 over the substrate are insulated from each other in the same layer by an insulation material 114, or overlapped with and insulted from each other by the insulation material 114 (not shown). As shown in FIG. 2E, the first touch electrode layer 110 is disposed on the array substrate 120, here, the first touch electrode layer 110 may also be disposed on a side of the color filter substrate 130 that is away from the array substrate 120 or a side of the color filter substrate facing to the array substrate 120.

From the above, the first touch electrode 111 and the second touch electrode 113 with different structures are disposed in the touch display device to function as the touch unit, and thereby in the touch display device, the first touch electrodes 111 may function as driving electrodes and correspondingly the second touch electrodes 113 may function as sensing electrodes. Alternatively, the first touch electrodes 111 may also function as sensing electrodes and correspondingly the second touch electrodes 113 may function as driving electrodes.

Figure 2F:
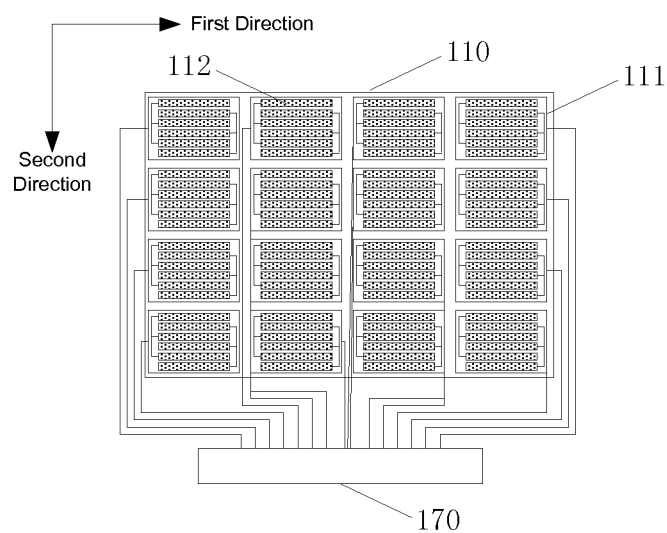
FIG. 2F is a schematic diagram showing the block first touch electrode, according to embodiments of the disclosure.

The first touch electrodes 111 of the first touch electrode layer 110 shown in FIGS. 2A to 2E are stripe electrodes. In some embodiments, in the case that the first touch electrode layer 110 is divided into a plurality of first touch electrodes 111, the first touch electrode 111 may further be block electrodes or strip electrodes extending along the first direction and arranged in an array, and any of the first touch electrodes 111 corresponds to an electrode lead. FIG. 2F is a schematic diagram showing the block first touch electrode 111, according to embodiments of the disclosure. Electrode leads of the block first touch electrodes 111 are connected to a peripheral drive circuit 170. Similarly, the block first touch electrode 111 may also be divided into a plurality of touch sub-electrodes 112, with each of the plurality of touch sub-electrodes 112 being located between two adjacent gate electrodes corresponding to the touch sub-electrode 112, which is consistent with the above description and not repeatedly discussed herein again.

The first touch electrode layer 110 of the touch display device illustrated by the present disclosure is divided into a plurality of first touch electrodes 111. In combination with FIGS. 2B to 2C, each of the first touch electrodes 111 is divided into a plurality of touch sub-electrodes 112 according to the arrangement manner of the gate electrodes 150, thereby accordingly reducing the parasitic capacitance between the touch sub-electrode 112 and the gate electrode 150. For any of the first touch electrodes 111, the plurality of touch sub-electrodes 112 divided by the first touch electrode 111 are connected at periphery of the gate electrodes 150, thereby reducing parasitic capacitance between the gate electrode 150 and the touch sub-electrode 112 and also implementing the integrality of the first touch electrode 111, while merely dividing the touch electrodes physically.

Figure 2G:
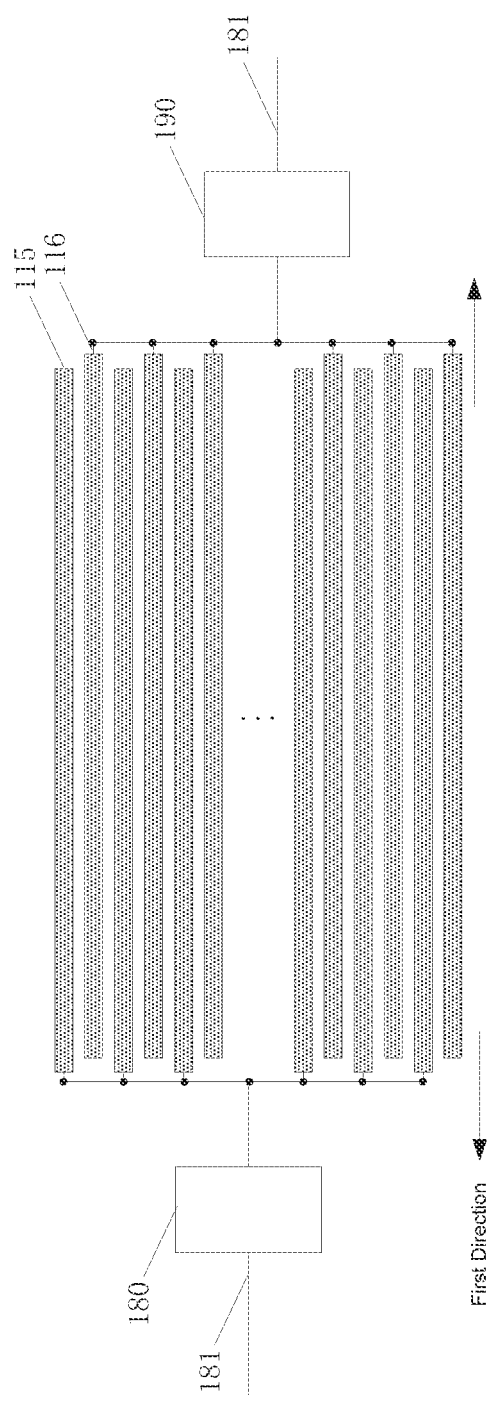
FIG. 2G is a schematic diagram showing connection manner of any of the first touch electrodes, according to embodiments of the disclosure.

FIG. 2G is a schematic diagram showing connection manner of any of the (strip) first touch electrodes 111, according to embodiments of the disclosure. The touch display device further includes a first driving circuit 180 and a second driving circuit 190, the plurality of touch sub-electrodes 112 of the first touch electrode 111 are divided into a first type of electrodes 115 and a second type of electrodes 116, electrode leads of the first type of electrodes 115 are led out in the first direction and connected to the first driving circuit 180, and electrode leads of the second type of electrodes 116 are led out in a direction reverse to the first direction and connected to the second driving circuit 190. The first type of electrodes 115 are odd rows of touch sub-electrodes 112, and the second type of electrodes 116 are even rows of touch sub-electrodes 112. By dividing the first touch electrode 111 into two types of electrodes, the first driving circuit 180 and the second driving circuit 190 simultaneously charge the first touch electrodes 111, thereby significantly reducing charging time of the first touch electrode 111.

Here, an inputting terminal of the first driving circuit 180 is connected with a touch signal transmitting line 181, an outputting terminal of the first driving circuit 180 is connected with the first type of electrodes 115, the first driving circuit 180 is configured to receive the touch signal and transmit the touch signal to the first type of electrodes 115; an inputting terminal of the second driving circuit 190 is connected with the touch signal transmitting line 181, an outputting terminal of the second driving circuit 190 is connected with the second type of electrodes 116, the second driving circuit 190 is configured to receive the touch signal and transmit the touch signal to the second type of electrodes 116.

According to connection manner of the first touch electrode 111 shown in FIG. 2G, operating process of any of the first touch electrodes 111 of the touch unit is that: the first driving circuit 180 and the second driving circuit 190 simultaneously receive touch signals, the first driving circuit 180 transmits the touch signal to the first type of electrodes 115 in the first touch electrode 111, the second driving circuit 190 transmits the touch signal to the second type of electrodes 116 in the first touch electrode 111, meaning that the first driving circuit 180 only drives half width of the first touch electrode 111, and the second driving circuit 190 only drives another half width of the first touch electrode 111. In comparison with related art, load capacitance of the touch signal on the first touch electrode 111 is decreased by half, and accordingly the charging time of first touch electrode 111 is also decreased by half.

It is noted that the first touch electrode 111 is not limited to that shown in FIG. 2G (i.e. including both the first driving circuit 180 and the second driving circuit 190), but may include only the first driving circuit 180 or include only the second driving circuit 190 so that only the driving circuit at a single side (e.g., the first driving circuit 180 or the second driving circuit 190) transmits the touch signal to the first type of electrodes 115 of the first touch electrode 111 or transmits the touch signal to the second type of electrodes 116 of the first touch electrode 111 in the specific operating process. By doing so, the number of the driving circuits can be reduced to facilitate the implementation of narrow border.

With the touch display device, according to embodiments of the disclosure, the first touch electrode layer 110 of the touch unit of the touch display device is divided into a plurality of first touch electrodes 111, each of which is divided into a plurality of touch sub-electrodes 112 according to the arrangement manner of the gate electrodes 150, and a projection of each of the touch sub-pixels 112 in a direction perpendicular to the array substrate 120 is located between two adjacent ones of the plurality of gate electrodes 150, so that the parasitic capacitance between the touch sub-electrodes 112 and the gate electrodes 150 is reduced. Additionally, the plurality of touch sub-electrodes 112 divided by the first touch electrode 111 are connected with each other at periphery of the gate electrodes 150, the first driving circuit 180 transmits the touch driving signal to the first type of electrodes 115 of the first touch electrode 111, and the second driving circuit 190 transmits the touch driving signal to the second type of electrodes 116 of the first touch electrode 111, so that the load of the touch driving signal in the first touch electrode 111 is reduced, thereby significantly reducing the charging time.

Figure 3A:
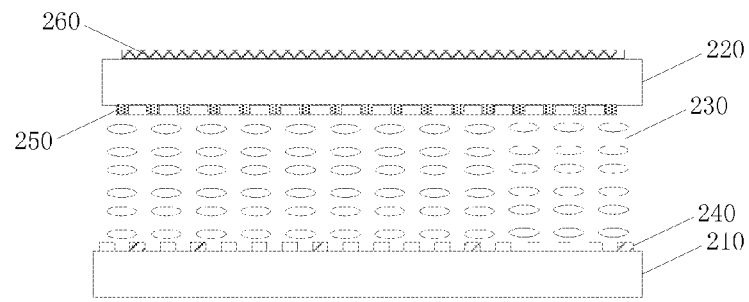
FIG. 3A is a cross-sectional diagram showing a touch display device, according to embodiments of the disclosure.

FIG. 3A is a cross-sectional diagram showing another touch display device, according to embodiments of the disclosure. The touch display device includes a touch unit and a display unit. The display unit includes an array substrate 210, a color filter substrate 220 disposed opposite to the array substrate 210, a display function layer 230 between the array substrate 210 and the color filter substrate 220, and a plurality of gate electrodes 240 on the array substrate 210. The touch unit includes a first touch electrode layer 250 having a plurality of touch electrodes 251, and also referring to FIG. 3B, each of the first touch electrodes 251 is formed of a plurality of touch sub-electrodes 252, where, a projection of each of the touch sub-electrodes 252 in a direction perpendicular to the array substrate 210 is located between two adjacent ones of the plurality of gate electrodes 240. As shown in FIG. 3A, the first touch electrode layer 250 is disposed on a side of the color filter substrate 220 facing to the array substrate 210, and the display function layer 230 may be a liquid crystal molecule layer.

Figure 3B:
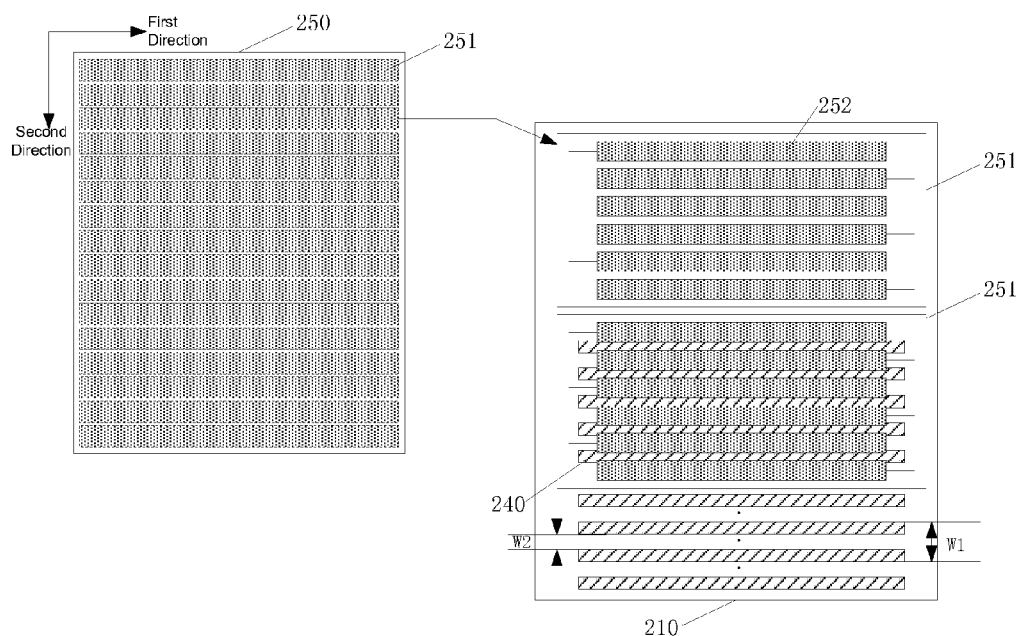
FIG. 3B is a top view showing the touch sub-electrodes in the first touch electrode, according to embodiments of the disclosure.

FIG. 3B is a top view showing the touch sub-electrodes in the first touch electrode, according to embodiments of the disclosure. Each of the touch sub-electrodes 252 partly covers the two adjacent gate electrodes 240 corresponding thereto; or each of touch sub-electrodes 252 uncovers (not shown) the two adjacent gate electrodes 240 corresponding thereto. For any two adjacent gate electrodes 240 of the gate electrodes 240, the distances between the two adjacent gate electrodes 240 include an outer width W1 and an inner width W2, where, the outer width W1 refers to a distance between two sides respectively of two adjacent gate electrodes 240 which are away from each other, and the inner width W2 refers to a distance between two sides respectively of the two adjacent gate electrodes 240 which face to each other. Hence, if the touch sub-electrode 252 partly covers the two adjacent gate electrodes 240 corresponding to the touch sub-electrode 252, the width of the touch sub-electrode 252 should be smaller than the outer width W1 between the two adjacent gate electrodes 240 corresponding to the touch sub-electrode 252, and larger than the inner width W2 between the two adjacent gate electrode 240 corresponding to the touch sub-electrode 252; if the touch sub-electrode 252 uncovers the two adjacent gate electrodes 240 corresponding thereto, the width of the touch sub-electrode 252 is smaller than or equal to the inner width W2 between the two adjacent gate electrode 240 corresponding to the touch sub-electrode 252.

Figure 3C:
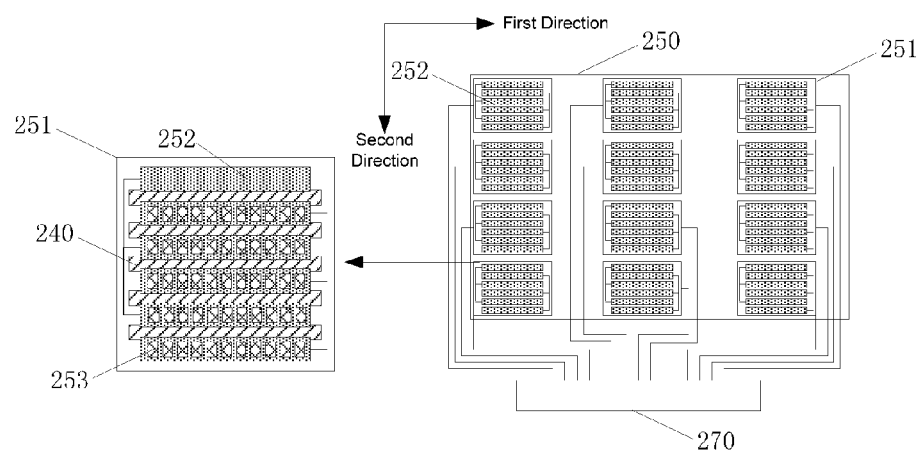
FIG. 3C is a top view showing the first touch electrode layer having block first touch electrodes, according to embodiments of the disclosure.

A plurality of first touch electrodes 251 are strip electrodes extending along a first direction and arranged along a second direction, and the second direction is perpendicular to the first direction. Additionally, FIG. 3C is a top view showing the first touch electrode layer 250 having block first touch electrodes 251, according to embodiments of the disclosure. A plurality of first touch electrodes 251 can be further block electrodes arranged in an array configuration, and any of the block first touch electrodes 251 corresponds to an individual electrode lead and connected to a peripheral drive circuit 270, where, the touch sub-electrodes 252 in the first touch electrode 251 cover pixels 253.

Figure 3D:
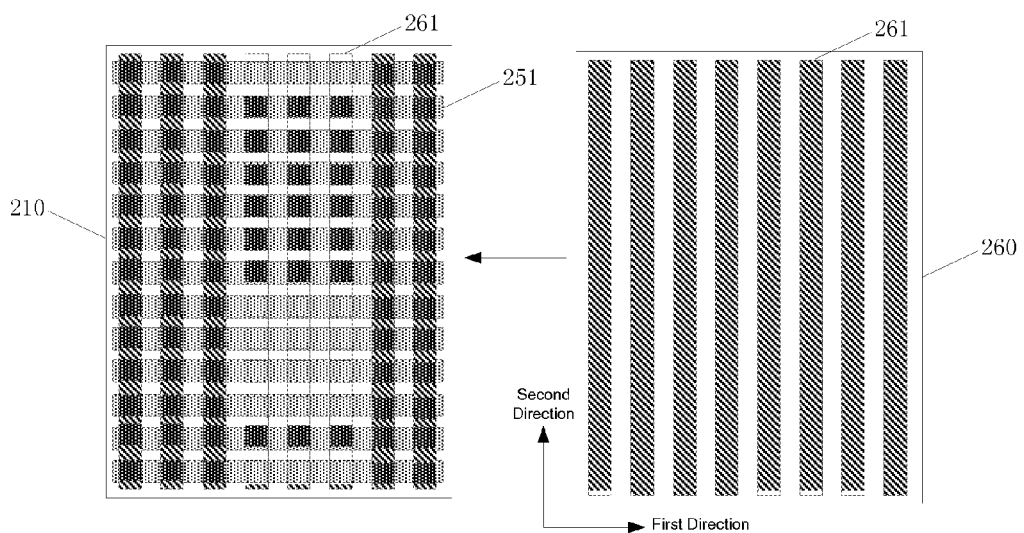
FIG. 3D is a top view showing a second touch electrode layer, according to embodiments of the disclosure.

As shown in FIG. 3A, the touch unit further includes a second touch electrode layer 260. FIG. 3D is a top view showing the second touch electrode layer 260, according to embodiments of the disclosure. The second touch electrode layer 260 and the first touch electrode layer 250, which together form the touch unit of the touch display device are in different layers. Here, in combination with FIG. 3A, the second touch electrode layer 260 includes a plurality of third touch electrodes 261 extending along the second direction and arranged along the first direction, a projection of the third touch electrode 261 of the second touch electrode layer 260 in a direction perpendicular to the array substrate 210 is perpendicular to a projection of the first touch electrode 251 of the first touch electrode layer 250 in a direction perpendicular to the array substrate 210, the third touch electrode 261 is located on a side of the color filter substrate 220 that is away from the array substrate 210, the first touch electrode 251 is located between the array substrate 210 and the color filter substrate 220. As shown in FIG. 3A, the second touch electrode layer 260 and the first touch electrode layer 250 are in different layers, and the second touch electrode layer 260 and the first touch electrode layer 250 are located on different substrates of the touch display device according to adhesive manner of the touch display device. According to the touch unit shown in FIGS. 3A and 3D, the first touch electrode 251 may be multiplexed as a driving electrode, and correspondingly the third touch electrode 261 may be multiplexed as a sensing electrode, or alternatively, the first touch electrode 251 may be multiplexed as a sensing electrode, and correspondingly the third touch electrode 261 may be multiplexed as a driving electrode.

It can be known from FIG. 3A that the first touch electrode layer 250 and the second touch electrode layer 260 are disposed in different layers. Here, the touch electrode and the common electrode of the touch display device operate in a time-sharing manner, and touch operating time and display operating time are performed in a competitive manner with each other. Therefore, if the touch display device is at a touch operating time, then the touch display device does not perform a display operation, if the touch display device is at a display operating time, then the touch display device does not perform a touch operation. In this case, according to the touch unit shown in FIGS. 3A and 3B, the first touch electrode layer 250 of the touch display device may be multiplexed as a common electrode layer, so that a plurality of common electrodes between the array substrate 210 and the color filter substrate 220 in the display unit are disposed in the same layer with the first touch electrodes 251. Accordingly, if the first touch electrode layer 250 functions as the common electrode layer, the first touch electrode layer 250 has both the touch function and the display function.

Figure 3E:
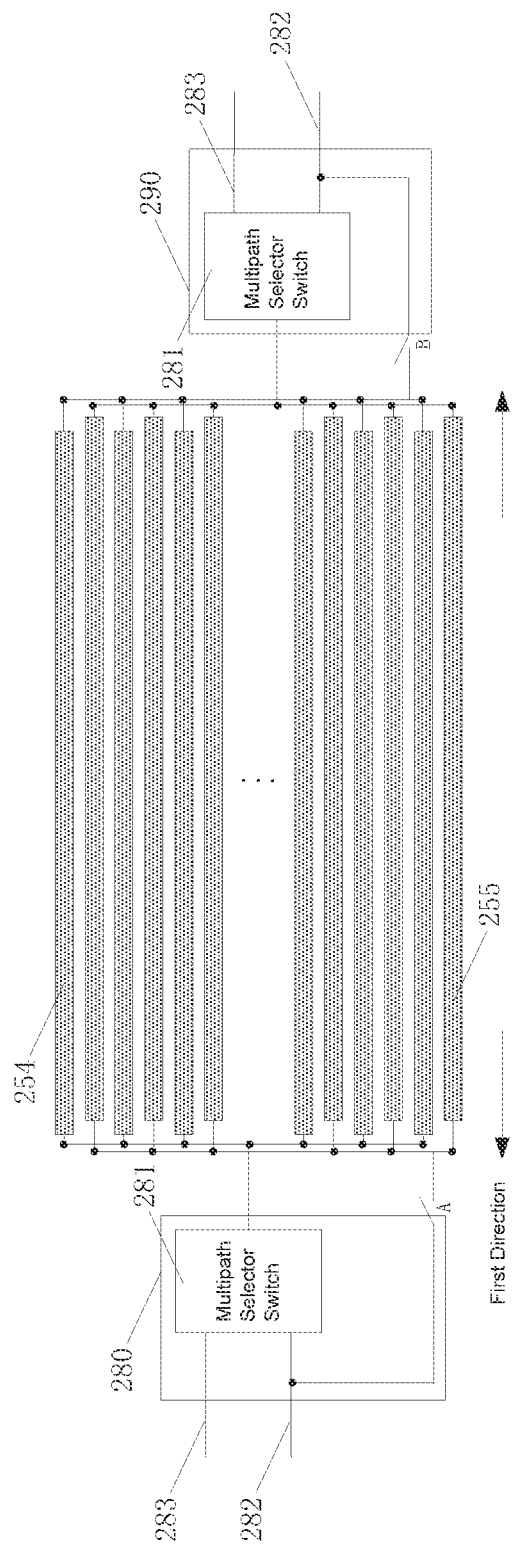
FIG. 3E is a schematic diagram showing a drive circuit of the first touch electrode, according to embodiments of the disclosure.

FIG. 3E is a schematic diagram showing a drive circuit of the first touch electrode 251, according to embodiments of the disclosure. In some embodiments, the touch display device further includes a first driving circuit 280 and a second driving circuit 290; a plurality of touch sub-electrodes 252 of the first touch electrode 251 are divided into a first type of electrodes 254 and a second type of electrodes 255, electrode leads of the first type of electrodes 254 are led out in the first direction and connected to the first driving circuit 280, and electrode leads of the second type of electrodes 255 are led out in a direction reverse to the first direction and connected to the second driving circuit 290, where, the first type of electrodes 254 may be odd rows of touch sub-electrodes 252 and the second type of electrodes 255 may be even rows of touch sub-electrodes 252.

In some embodiments, the first touch electrode layer 250 functions as the common electrode layer and hence have the display function, and accordingly an inputting terminal of the first driving circuit 280 of the touch display device can be connected with a display signal transmitting line 282, an outputting terminal of the first driving circuit 280 of the touch display device is connected with the first type of electrodes 254, an inputting terminal of the second driving circuit 290 is connected with the display signal transmitting line 282, and an outputting terminal of the second driving circuit 290 is connected with the second type of electrodes 255.

As described above, for any of the first touch electrodes 251, when the first touch electrode layer 250 is at a display operating time, the first driving circuit 280 receives a display signal and transmits the display signal to the first type of electrodes 254 of the first touch electrodes 251, and simultaneously, the second driving circuit 290 receives the display signal and transmits the display signal to the second type of electrodes 255 of the first touch electrodes 251, in order to drive the display of the first touch electrodes 251. Here, the display signal is a direct current voltage signal close to 0V.

In order to enable the voltage received by each of the touch sub-electrodes 252 to be uniform, the electrode leads of the first type of electrodes 254 in the first touch electrodes 251 may further be led out in a direction reverse to the first direction and connected to the second driving circuit 290 via a switch B, and likewise, the electrode leads of the second type of electrodes 255 are further led out in the first direction and connected to the first driving circuit 280 via a switch A; also, the inputting terminal of the first driving circuit 280 is connected with the display signal transmitting line 282, a first outputting terminal of the first driving circuit 280 is connected with the first type of electrodes 254 and a second outputting terminal of the first driving circuit 280 is connected with the second type of electrodes 255; also, the inputting terminal of the second driving circuit 290 is connected with the display signal transmitting line 282, a first outputting terminal of the second driving circuit 290 is connected with the second type of electrodes 255, and a second outputting terminal of the second driving circuit 290 is connected with the first type of electrodes 254. Therefore, when the switches A and B are turned-on and the display signal is apply to the first touch electrodes 251, the display signal will be applied to each of the touch sub-electrodes 252 of the first touch electrodes 251 in the first direction by the first driving circuit 280, and the display signal will be applied to each of the touch sub-electrodes 252 of the first touch electrodes 251 in a direction reverse to the first direction by the second driving circuit 290, so that an uniform voltage of each of the touch sub-electrodes 252 can be achieved and hence the charging is uniform and rapid.

In order to enable the first touch electrodes 251 to perform both the touch operation and the display operation, the first driving circuit 280 is further connected with a touch signal transmitting line 283, and the second driving circuit 290 is further connected with the touch signal transmitting line 283, so that the first driving circuit 280 and the second driving circuit 290 can simultaneously receive the touch signal and the display signal. In order to enable the first touch electrodes 251 to perform corresponding functions during different operations, a multipath selector switch 281 is further added respectively in the first driving circuit 280 and the second driving circuit 290, and when the first driving circuit 280 simultaneously receives the touch signal and the display signal, the display signal or the touch signal can be selectively transmitted to the touch sub-electrodes 252 by the multipath selector switch 281. The operating manner of the second driving circuit 290 is the same as that of the first driving circuit 280, which is not repeatedly discussed again. Therefore, the first touch electrodes 251 simultaneously achieve both the touch function and the display function, and specific operating process of the first touch electrodes 251 is as follows (1) during the display operation: the switches A and B are turned-on (or may also be not turned-on), the first driving circuit 280 and the second driving circuit 290 respectively receive the display signal, and the multipath selector switch 281 selectively pass through the display signal, so that the first driving circuit 280 transmits the received display signal to the first type of electrodes 254 in the first direction through the multipath selector switch 281, and transmits the display signal to the second type of electrodes 255 in the first direction through the turned-on switch A; also, the second driving circuit 290 transmits the received display signal to the second type of electrodes 255 in a direction reverse to the first direction through the multipath selector switch 281 and transmits the display signal to the first type of electrodes 254 in a direction reverse to the first direction by the turned-on switch B.

With the touch display device, according to embodiments of the disclosure, the first touch electrode layer 250 of the touch unit of the touch display device is multiplexed as the common electrode layer, the first driving circuit 280 and the second driving circuit 290 connected to the first touch electrodes 251 can receive the touch signal and the display signal to achieve both the touch function and the display function of the first touch electrode layer 250 in the touch display device.

The present disclosure further provides a method for driving a touch display device of which the technical solution is suitable for driving a self-capacitance touch display device, and the method is configured to drive the touch display device described in the above embodiments, and the method includes:

applying a touch driving signal to a plurality of first touch electrodes; outputting a touch sensing signal by the plurality of first touch electrodes when a touch occurs; and determining a position of a touch point according to the change of the touch sensing signal of the plurality of first touch electrodes relative to the touch driving signal before and after the touch.

The first touch electrodes of the first touch electrode layer forms a capacitance along with ground to constitute a self-capacitance structure, and the first driving circuit and the second driving circuit apply the touch driving signal to the plurality of first touch electrodes of the first touch electrode layer, i.e. charging the first touch electrodes, and after the charging is finished, the touch operation can be performed. When a finger or other object touches the touch display device, the capacitance between the first touch electrode at the touch point and the ground is changed, and the capacitances of the corresponding first touch electrodes around the touch point are changed to an extent incompletely same with each other. Changes of the currents on the plurality of first touch electrodes are detected, and then a position of a touch point is determined according to variation amount of current sensed on the first touch electrodes relative to the charging current.

The present disclosure further provides a method for driving a touch display device of which the technical solution is suitable for driving a mutual capacitance touch display device, and the method is configured to drive the touch display device described in the above embodiments, and the method includes:

applying a touch driving signal to a plurality of driving electrodes; outputting a touch sensing signal by the plurality of touch electrodes when a touch occurs; and determining a position of a touch point according to the change of the touch sensing signal before and after the touch; wherein, if the driving electrodes are first touch electrodes, the sensing electrodes are second touch electrodes or third touch electrodes, or if the driving electrodes are second touch electrodes or third touch electrodes, the sensing electrodes are first touch electrodes.

The driving electrodes are perpendicular to and overlapped with the sensing electrodes, the driving electrodes and the sensing electrodes perpendicular to each other will form a coupling capacitance to constitute a mutual capacitance structure, and a touch driving signal is applied to the driving electrodes. When a finger touches the touch display device, the touch occurs. The touch of the finger changes the coupling capacitance between the driving electrodes and the sensing electrodes at the touch point and changes the coupling capacitance of the touch point. Accordingly, the signal on the sensing electrodes is changed, and touch point coordinates can be computed according the variation mount of the signal, thereby determining a position of the touch point.

Figure 4:
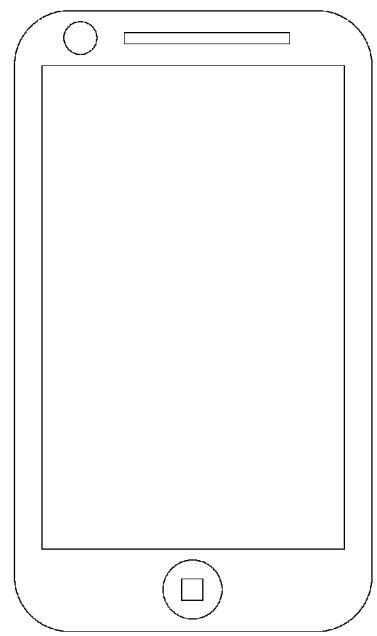
FIG. 4 is a schematic diagram of a touch display device, according to embodiments of the disclosure.

The present disclosure further provides a touch display apparatus including the touch display device described in the above embodiments. The touch display apparatus may be applied to an electronic device such as a cellphone, a tablet computer, as shown in FIG. 4.

The above product can perform the method provided by any of the embodiments of the disclosure, and have function modules for performing the method and beneficial effects.

It is noted that the embodiments and the applied technology principles of the present disclosure are merely described as above. It should be understood for those skilled in the art that the present disclosure is not limited to particular embodiments described herein. Various apparent changes, readjustment and alternatives can be made by those skilled in the art without departing the scope of protection of the present disclosure. Therefore, although the present disclosure is illustrated in detail through the above embodiments, the present disclosure is not merely limited to the above embodiments, and can further include more of other equivalent embodiments without departing the conception of the present disclosure. The scope of the present disclosure is subject to the appended claims.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A touch display device, comprising:
a touch unit and a display unit;
the touch unit comprises a first touch electrode layer having a plurality of first touch electrodes, each of which comprises a plurality of touch sub-electrodes;
the display unit comprises an array substrate, a color filter substrate disposed opposite to the array substrate, a display function layer disposed between the array substrate and the color filter substrate, and a plurality of gate electrodes disposed on the array substrate;
wherein, a projection of each of the touch sub-electrodes in a direction perpendicular to the array substrate is located between two adjacent ones of the plurality of gate electrodes;
wherein, each of the touch sub-electrodes partly covers the two adjacent gate electrodes corresponding to the touch sub-electrode, and a width of the touch sub-electrode is smaller than an outer width between the two adjacent gate electrodes corresponding to the touch sub-electrode, and larger than an inner width between the two adjacent gate electrode corresponding to the touch sub-electrode; or each of the touch sub-electrodes does not cover the two adjacent gate electrodes corresponding to the touch sub-electrode, and the width of the touch sub-electrode is smaller than or equal to the inner width between the two adjacent gate electrode corresponding to the touch sub-electrode; wherein, the outer width is a distance between a first side of a first gate electrode and a second side of a second gate electrode, the first side and the second side are facing away from each other, and the inner width is a distance between a third side of the first gate electrode and a fourth side of the second gate electrode, the third side and the fourth side face each other, wherein the first gate electrode and the second gate electrode are the two adjacent gate electrodes.

2. The touch display device of claim 1, wherein, the plurality of the first touch electrodes are strip electrodes extending along a first direction and arranged along a second direction, and the second direction is perpendicular to the first direction.

3. The touch display device of claim 2, wherein, the first touch electrode layer further comprises a plurality of second touch electrodes extending along the second direction and arranged along the first direction; the first touch electrodes are insulated from the second touch electrodes in the same layer or are insulated from and overlap the second touch electrodes, and the first touch electrodes and the second touch electrodes are disposed on a side of the color filter substrate that is away from the array substrate or disposed between the color filter substrate and the array substrate; the first touch electrodes are driving electrodes and the second touch electrodes are sensing electrodes, or the first touch electrodes are sensing electrodes and the second touch electrodes are driving electrodes.

4. The touch display device of claim 2, wherein, the touch unit further comprises a second touch electrode layer, and the second touch electrode layer comprises a plurality of third touch electrodes extending along the second direction and arranged along the first direction; the third touch electrodes are located on a side of the color filter substrate that is facing away from the array substrate, and the first touch electrodes are located between the array substrate and the color filter substrate; the first touch electrodes are driving electrodes and the third touch electrodes are sensing electrodes, or the first touch electrodes are sensing electrodes and the third touch electrodes are driving electrodes.

5. The touch display device of claim 4, wherein, the display unit has a plurality of common electrodes located between the array substrate and the color filter substrate, and the first touch electrodes and the common electrodes are disposed at the same layer.

6. The touch display device of claim 2 wherein, the touch display device further comprises a first driving circuit and a second driving circuit; the plurality of touch sub-electrodes of the first touch electrode are divided into a first type of electrodes and a second type of electrodes, electrode leads of the first type of electrodes are led out in the first direction and connected to the first driving circuit, and electrode leads of the second type of electrodes are led out in a direction opposite to the first direction and connected to the second driving circuit.

7. The touch display device of claim 6, wherein, the first type of electrodes are odd rows of the touch sub-electrodes, and the second type of electrodes are even rows of the touch sub-electrodes.

8. The touch display device of claim 7, wherein, an inputting terminal of the first driving circuit is connected with a touch signal transmitting line, an outputting terminal of the first driving circuit is connected with the first type of electrodes, and the first driving circuit is configured to receive the touch signal and transmit the touch signal to the first type of electrodes; an inputting terminal of the second driving circuit is connected with the touch signal transmitting line, an outputting terminal of the second driving circuit is connected with the second type of electrodes, and the second driving circuit is configured to receive the touch signal and transmit the touch signal to the second type of electrodes.

9. The touch display device of claim 7, wherein, an inputting terminal of the first driving circuit is connected with a display signal transmitting line, an outputting terminal of the first driving circuit is connected with the first type of electrodes, and the first driving circuit is configured to receive the display signal and transmit the display signal to the first type of electrodes; an inputting terminal of the second driving circuit is connected with the display signal transmitting line, an outputting terminal of the second driving circuit is connected with the second type of electrodes, and the second driving circuit is configured to receive the display signal and transmit the display signal to the second type of electrodes.

10. The touch display device of claim 7, wherein, the electrode leads of the first type of electrodes are further led out in a direction opposite to the first direction and connected to the second driving circuit, and electrode leads of the second type of electrodes are led out from the first direction and connected to the first driving circuit; an inputting terminal of the first driving circuit is connected with a display signal transmitting line, an first outputting terminal of the first driving circuit is connected with the first type of electrodes, an second outputting terminal of the first driving circuit is connected with the second type of electrodes, and the first driving circuit is configured to receive the display signal and transmit the display signal to the first type of electrodes and the second type of electrodes; an inputting terminal of the second driving circuit is connected with the display signal transmitting line, an first outputting terminal of the second driving circuit is connected with the second type of electrodes, an second outputting terminal of the second driving circuit is connected with the first type of electrodes, and the second driving circuit is configured to receive the display signal and transmit the display signal to the second type of electrodes and the first type of electrodes.

11. The touch display device of claim 1, wherein, a plurality of the first touch electrodes are block electrodes or strip electrodes extending along a first direction and arranged in an array, and each of the first touch electrodes corresponds to an electrode lead.

12. The touch display device of claim 11, wherein, the touch display device further comprises a first driving circuit and a second driving circuit; the plurality of touch sub-electrodes of the first touch electrode are divided into a first type of electrodes and a second type of electrodes, electrode leads of the first type of electrodes are led out in the first direction and connected to the first driving circuit, and electrode leads of the second type of electrodes are led out in a direction opposite to the first direction and connected to the second driving circuit.

13. A method for driving a touch display device, wherein, the method is configured to drive a touch display device of claim 1 and comprises:
applying a touch driving signal to the plurality of first touch electrodes; outputting a touch sensing signal by the plurality of first touch electrodes when a touch occurs; and determining a position of a touch point according to a change of the touch sensing signal of the plurality of first touch electrodes relative to the touch driving signal before and after the touch.

14. A method for driving a touch display device, wherein, the method is configured to drive the touch display device of claim 1 and the method comprises:
applying a touch driving signal to a plurality of driving electrodes; outputting a touch sensing signal by a plurality of sensing electrodes when a touch occurs; and determining a position of a touch point according to a change of the touch sensing signal before and after the touch;
wherein, the driving electrodes are the first touch electrodes, the sensing electrodes are second touch electrodes or third touch electrodes, or the driving electrodes are second touch electrodes or third touch electrodes, the sensing electrodes are the first touch electrodes.

15. A touch display apparatus, comprising the touch display device of claim 1.

* * * * *